(12) United States Patent
Ohkubo

(10) Patent No.: US 6,229,915 B1
(45) Date of Patent: *May 8, 2001

(54) METHOD OF CONVERTING DATA OF A FIRST COLORIMETRIC SYSTEM TO DATA OF A SECOND COLORIMETRIC SYSTEM, INCLUDING A MAPPING OF OUT OF BOUNDARY DATA

(75) Inventor: Akito Ohkubo, Minamiashigara (JP)

(73) Assignee: Fuji Photo Film Co., Ltd., Kanagawa-Ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/910,012

(22) Filed: Aug. 12, 1997

(30) Foreign Application Priority Data

Aug. 22, 1996 (JP) ............. 8-221542

(51) Int. Cl.[7] ........................ G06K 9/00
(52) U.S. Cl. ...................... 382/167; 358/518
(58) Field of Search .................. 382/167, 162; 358/515, 518, 520, 523, 525; 347/43, 115, 117, 232

(56) References Cited

U.S. PATENT DOCUMENTS

| | | | |
|---|---|---|---|
| 5,574,666 | * 11/1996 | Ruetz et al. | 395/101 |
| 5,774,238 | * 6/1998 | Tsukada | 358/529 |
| 5,875,260 | * 2/1999 | Ohta | 382/162 |
| 5,883,632 | * 3/1999 | Dillinger | 345/431 |

FOREIGN PATENT DOCUMENTS 4-196675   7/1992   (JP) ............... H04N/1/40

OTHER PUBLICATIONS

D.M. Considine, Ed, VanNostrand's Scientific Encyclopedia, 5th Ed, Van Nostrand, p 1906.*

* cited by examiner

Primary Examiner—Yon J. Couso
(74) Attorney, Agent, or Firm—Sughrue, Mion, Zinn, Macpeak & Seas, PLLC

(57) ABSTRACT

After the relationship between data of a second colorimetric system with respect to data of a first colorimetric system in a color reproduction range is determined as a conversion relationship, the data of the second colorimetric system at the boundary of the color reproduction range are set to data outside the color reproduction range. Using data CMY of the second colorimetric system at the boundary of the color reproduction range, data outside the color reproduction range are estimated according to a multiple regression analysis, thus generating a new conversion relationship. Using the new conversion relationship, data of the first colorimetric system are converted into data of the second colorimetric system, which are thereafter processed by gamut mapping within the color reproduction range.

22 Claims, 11 Drawing Sheets

METHOD OF CONVERTING DATA OF A FIRST COLORIMETRIC SYSTEM TO DATA OF A SECOND COLORIMETRIC SYSTEM, INCLUDING A MAPPING OF OUT OF BOUNDARY DATA

BACKGROUND OF THE INVENTION

1. Field of the Invention

The present invention relates to a method of converting data of a first colorimetric system into data of a second colorimetric system, which include data outside a color reproduction range, and thereafter mapping the converted data into the color reproduction range.

2. Description of the Related Art

Color reproduction ranges, i.e., ranges in which colors can be reproduced, vary depending on the medium used and the output device used. For example, a range of the colors of a color image displayed on a CRT display differs from a range of the colors of a color image outputted from an image output device such as a color printer or the like. When color data supplied from a first color data processing device is supplied to a second color data processing device which has different characteristics from the first color data processing device, there may be colors from the first color data processing device that cannot be processed by the second color data processing device. If there are such colors, then it is customary to carry out a gamut mapping process for mapping color data outside a color reproduction range of the second color data processing device into the color reproduction range.

According to a known process disclosed in Japanese laid-open patent publication No. 4-196675, for example, color data of a first color data processing device are converted into color data in a common color space such as an L*u*v* colorimetric system independent of the first color data processing device, then L*, u*, v* values of the color data in the common color space are compressed on the basis of a desired relationship, and thereafter the compressed data are converted into color data in a color space inherent in a second color data processing device.

If the color data are mapped in the common color space according to a gamut mapping process, then the mapped color data may not be desirable data for use in the second color data processing device, and a color image reproduced on the basis of the color data thus obtained may look unnatural as compared with the original color image. For this reason, the color data should be mapped in the color space inherent in the second color data processing device.

If the inherent color space comprises color data of four variables C (cyan), M (magenta), Y (yellow), K (black) (which may hereinafter be referred to as color data CMYK), e.g., color data for use in color printing, and also if the four-variable color data CMYK in the inherent color space which correspond to three-variable color data in the common color space are outside a color reproduction range, then the color data CMYK need to be mapped into the color reproduction range. It is noted that the variable K may be represented as a function of one or more of the variables Y, M, C. However, the K variable is often described as a fourth component in the YMCK color space. In the mapping process, depending on settings for the color data K, colors may change greatly or may become different in the vicinity of the color data mapped from outside the color reproduction range. Stated otherwise, for converting color data of three variables into color data of four variables, it is necessary to determine a conversion relationship by fixing one of the variables to a given value. If such one variable is color data K, then settings for the color data K greatly affect the mapping process.

SUMMARY OF THE INVENTION

It is a general object of the present invention to provide a method of converting data of a first colorimetric system into data of a second colorimetric system for preventing colors of a color image generated on the basis of converted data from looking unnatural or changing greatly in the vicinity of the boundary of a color reproduction range.

A major object of the present invention is to provide a method of converting color data of three variables into color data of four variables while preventing settings for color data of one variable fixed to a given value from greatly affecting a mapping process.

Another object of the present invention is to provide a method of converting color data of three variables into color data of CMYK while preventing settings for color data K of one variable fixed to a given value from greatly affecting a mapping process.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENT

According to the present invention, a color conversion relationship for converting data (XYZ) of a first colorimetric system into data (CMYK) of a second colorimetric system is determined. If said data of the second colorimetric system produced by said color conversion relationship fall outside a color reproduction range of said second colorimetric system, then data of the second colorimetric system are estimated and established again using the data in the color reproduction range close to the data of the first colorimetric system which correspond to the data of the second colorimetric system-outside of the color reproduction range. The color conversion relationship thus produced prevents the data of the second colorimetric system from suffering variations in the vicinity of the boundary of the color reproduction range. Using the color conversion relationship thus determined, the data of the second colorimetric system are processed by gamut mapping so that all the same are brought into the color reproduction range. The data of the second colorimetric system thus generated are freed of undue variations and jumps.

According to the present invention, furthermore, a color conversion relationship for converting data of three variables, e.g., X, Y, Z, of a first colorimetric system into data of four variables, e.g., C, M, Y, K of a second colorimetric system. If the data of the second colorimetric system fall outside a color reproduction range, then data in the color reproduction range close to the data of the first colorimetric system which correspond to the data of the second colorimetric system outside the color reproduction range are determined, and data of one of the variables, e.g., data of K, of those determined data are established as data outside the color reproduction range. Thereafter, data of the other three variables are estimated from the data in the color reproduction range to determine a color conversion relationship. Using color conversion relationships thus determined, the data of the second colorimetric system are processed by gamut mapping. The processed data of the second colorimetric system are prevented from suffering undue variations or jumps even though the data of the one of the variables tend to vary. The process according to the invention is particularly effective if the one of the variables is K.

Figure 1:
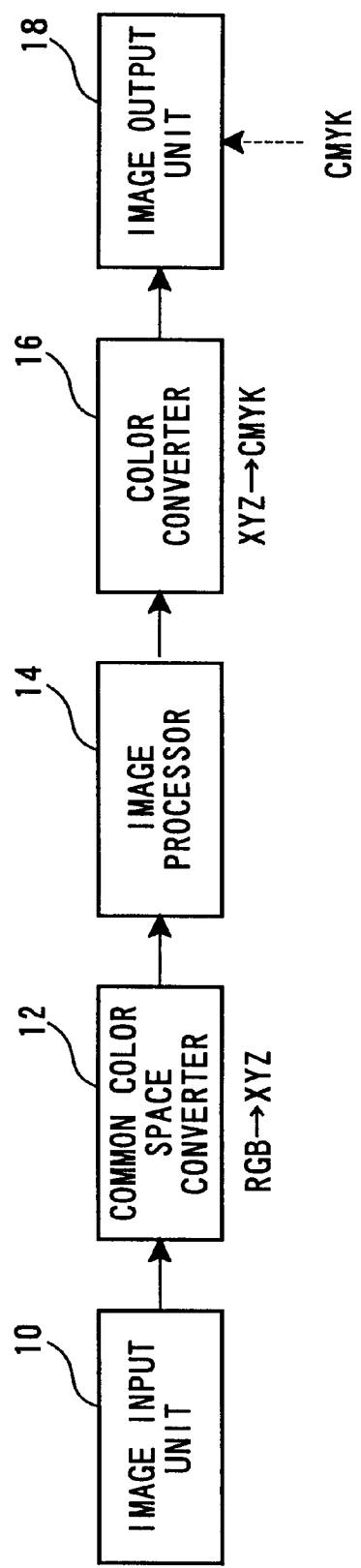
FIG. 1 is a block diagram of an image output device.

FIG. 1 shows in block form an image output device which incorporates an inverse conversion table (inverse conversion relationship) generated by a color conversion method according to the present invention. The image output device serves to record a color image based on image data comprising color data of four variables C, M, Y, K. The image output device comprises an image input unit 10 for either reading a color subject and generating color data of three variables R, G, B (which may hereinafter be referred to as color data RGB) or receiving color data RGB from an external source, a common color space converter 12 for converting color data RGB from the image input unit 10 into stimulus value data of three variables X, Y, Z (which may hereinafter be referred to as stimulus value data XYZ) in a common color space independent of the output characteristics of the image output device, an image processor 14 for processing the stimulus value data XYZ to predict colors of a printed document, for example, a color converter 16 for converting the processed stimulus value data XYZ into color data CMYK inherent in the image output device using an inverse conversion table which has been produced by a conversion table generating device (described later on), and an image output unit 18 for outputting an image based on the color data CMYK.

In the illustrated embodiment, a conversion process for conversion between color data CMYK and stimulus value data XYZ will be described below. However, the present invention is also applicable to a conversion process for conversion between color data CMYK and color data of an L*a*b* colorimetric system, an L*u*v* colorimetric system, an RGB colorimetric system, etc.

Figure 2:
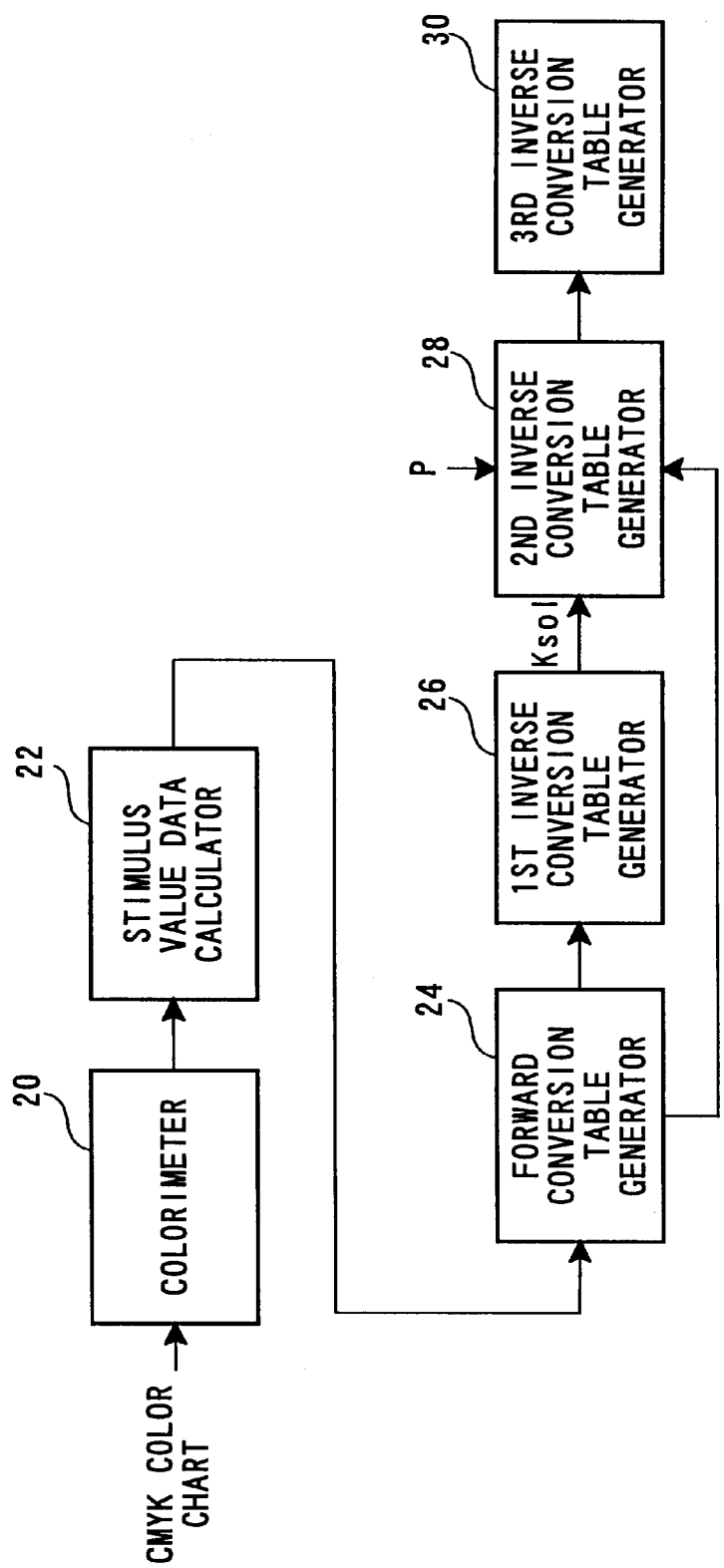
FIG. 2 is a block diagram of a conversion table generating device.

FIG. 2 shows in block form a conversion table generating device for generating an inverse conversion table to be established in the color converter 16 of the image output device shown in FIG. 1. As shown in FIG. 2, the conversion table generating device comprises a calorimeter 20 for measuring colorimetric data of a CMYK color chart produced from known color data CMYK, a stimulus value data calculator 22 for calculating stimulus value data XYZ of the CMYK color chart based on a signal from the colorimeter 20, a forward conversion table generator 24 for generating a forward conversion table which represents a relationship of the stimulus value data XYZ with respect to the known color data CMYK, a first inverse conversion table generator 26 for generating a first inverse conversion table which represents a relationship of the color data CMYK with respect to the stimulus value data XYZ with the color data K being fixed to given color data Ksol, using a repetitive calculation process, from the forward conversion table, a second inverse conversion table generator 28 for establishing a multiplication factor P ($0 \leq P \leq 1$) for the color data K with respect to the color data Ksol, and generating a second inverse conversion table which represents a relationship of the color data CMYK in a color reproduction range of the image output device with respect to the stimulus value data XYZ and which is capable of producing color data K closest to color data Ksol·P, using a repetitive calculation process, from the forward conversion table, and a third inverse conversion table generator 30 for determining color data CMYK outside the color reproduction range of the image output device with respect to the stimulus value data XYZ, and combining the determined color data CMYK with the inverse conversion table in the color reproduction range generated by the second inverse conversion table generator 28 into a third inverse conversion table for converting all the stimulus value data XYZ into all color data CMYK including data outside the color reproduction range.

The CMYK color chart is generated according to the known color data CMYK with respect to the image output unit 18 shown in FIG. 1, e.g., according to halftone dot percent data at equal intervals, e.g., at 0%, 5%, 10%, . . . , 100%, of each of the known color data CMYK.

Figure 3A:
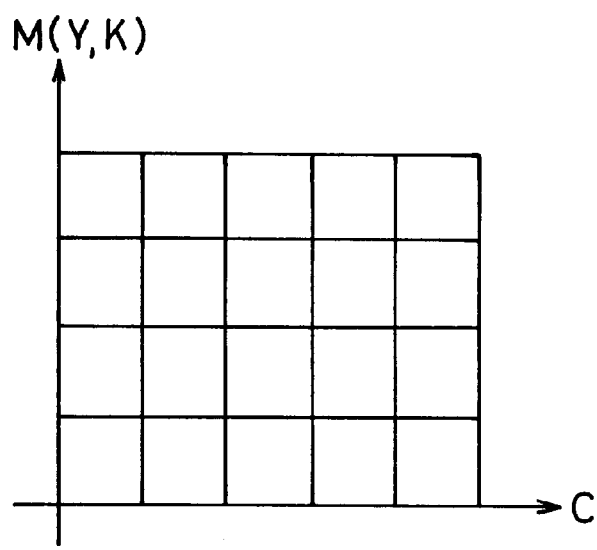
FIG. 3A is a diagram illustrative of color data CMYK for generating a CMYK color chart established in a CMYK color space.
Figure 3B:
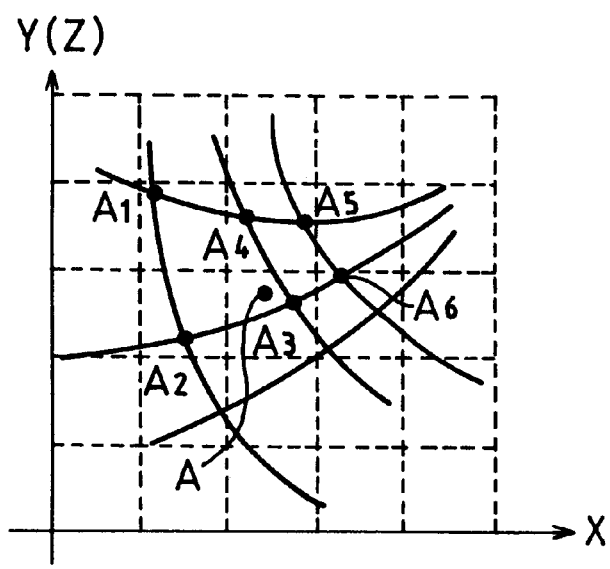
FIG. 3B is a diagram illustrative of stimulus value data XYZ in an XYZ color space obtained by measuring colorimetric data of the color data CMYK.

The relationship between the forward conversion table and the inverse conversion tables will be described below with reference to FIGS. 3A and 3B. FIG. 3A shows a two-dimensional representation of the color data CMYK of the CMYK color chart, the color data CMYK corresponding to grid points at equal intervals. FIG. 3B shows a two-dimensional representation of stimulus value data XYZ produced by measuring colorimetric data of the color data CMYK at the grid points, the stimulus value data XYZ corresponding to grid points at highly irregular intervals. The forward conversion table serves to determine stimulus value data XYZ for arbitrary color data CMYK in the relationship shown in FIG. 3A, and the inverse conversion tables serve to determine color data CMYK for arbitrary stimulus value data XYZ in the relationship shown in FIG. 3B. Specifically, for determining color data CMYK for stimulus value data XYZ at a point A, color data CMYK at points A1~A4 should be interpolated, but actually, color data CMYK at points A3~A6 near the point A may possibly be interpolated. Furthermore, the inverse conversion tables represent the relationship for determining four variables from three variables. According to the illustrated embodiment, the color data K are fixed, establishing a relationship between three-variable color data and three-variable color data, and the inverse conversion tables are determined using a repetitive calculation process.

A process of generating the first inverse conversion table will be described below with reference to FIG. 4.

A plurality of color data CMYK at regular intervals are supplied to the image output unit 18 of the image output device to generate CMYK color charts in which the densities and mixed ratios of C, M, Y, K vary stepwise in a step S10. Then, in the conversion table generating device shown in FIG. 2, colorimetric values of each of the CMYK color charts are measured by the colorimeter 20 in a step S11, and stimulus value data XYZ are determined from the measured colorimetric values by the stimulus value data calculator 22. The forward conversion table generator 24 generates a forward conversion table capable of obtaining stimulus value data XYZ from the color data CMYK of each of the CMYK color charts in a step S12.

Then, according to the illustrated embodiment, in order to determine an inverse conversion table from the relationship between three-variable color data and three-variable color data, the first inverse conversion table generator 26 fixes the color data K to a maximum value Kmax in a step S13, and determines color data CMY with respect to the stimulus value data XYZ according to a repetitive calculation process, using the forward conversion table in a step S14.

The repetitive calculation process will be described below with reference to FIG. 5.

Figure 6:
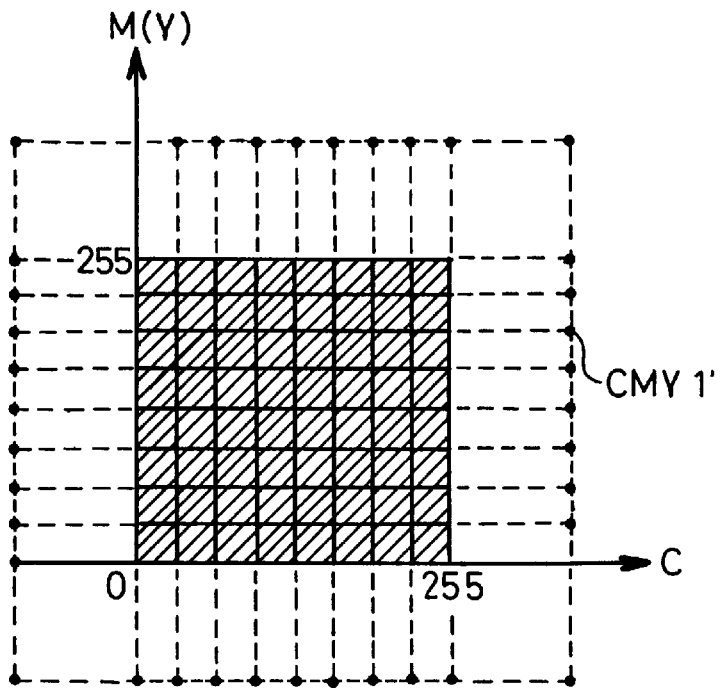
FIG. 6 is a diagram illustrative of color data CMY including a hypothetical color signal.

With the color data K being fixed, a color representation range of the color charts that can be represented by the color data CMY is indicated by a hatched area in FIG. 6 where the minimum density of each of the color charts of C, M, Y is 0 and the maximum density thereof is 255. According to the repetitive calculation process, data calculated thereby may fall outside the color reproduction range, and if only data in the color reproduction range were processed, the results of the repetitive calculation process would possibly become divergent. To avoid this, hypothetical data CMY1* are established at sufficiently spaced position outside the color reproduction range, and hypothetical stimulus value data XYZ1* corresponding to the hypothetical data CMY1* are determined in a step S14A.

At this time, the hypothetical stimulus value data XYZ1* are determined using the method of least squares, on the assumption that the relationship between the stimulus value data XYZ and the color data CMY is monotonous. This assumption is ensured by the fact that as the color data CMY increase, the amount of light reflected from the color charts decrease, and the stimulus value data XYZ monotonously decrease.

Then, four-dimensional planes X-CMY, Y-CMY, Z-CMY are determined according to the method of least squares using all data sets (Ci, Mi, Yi, Xi, Yi, Zi: i is the number of a color chart) of the color data CMY and the stimulus value data XYZ obtained from the color charts. The four-dimensional planes are defined by the equation (1):

$$T = A \cdot D \quad (1)$$

The equation (1) represents the relationship according to the following equation (2):

$$\begin{bmatrix} X \\ Y \\ Z \end{bmatrix} = \begin{bmatrix} A_{X1} & A_{X2} & A_{X3} & A_{X4} \\ A_{Y1} & A_{Y2} & A_{Y3} & A_{Y4} \\ A_{Z1} & A_{Z2} & A_{Z3} & A_{Z4} \end{bmatrix} \begin{bmatrix} C \\ M \\ Y \\ 1 \end{bmatrix} \quad (2)$$

The coefficient A which satisfies the equation (1) above is determined using the method of least squares so that E represented by the equation (3) shown below will be minimum. In the equation (3), "i" indicates the number of a color chart and the superscript "T" indicates the transpose of a matrix where rows and columns are interchanged.

$$E = \sum_i (T_i - A \cdot D_i) \cdot (T_i - A \cdot D_i)^T \quad (3)$$

When the coefficient A is determined from the equation (3), the four-dimensional planes X-CMY, Y-CMY, Z-CMY are determined. Then, on the four-dimensional planes X-CMY, Y-CMY, Z-CMY, hypothetical data CMY1* at a position sufficiently remote from the color data CMY of the CMYK color charts with the color data K fixed, and corresponding hypothetical stimulus value data XYZ1* are determined.

Figure 7:
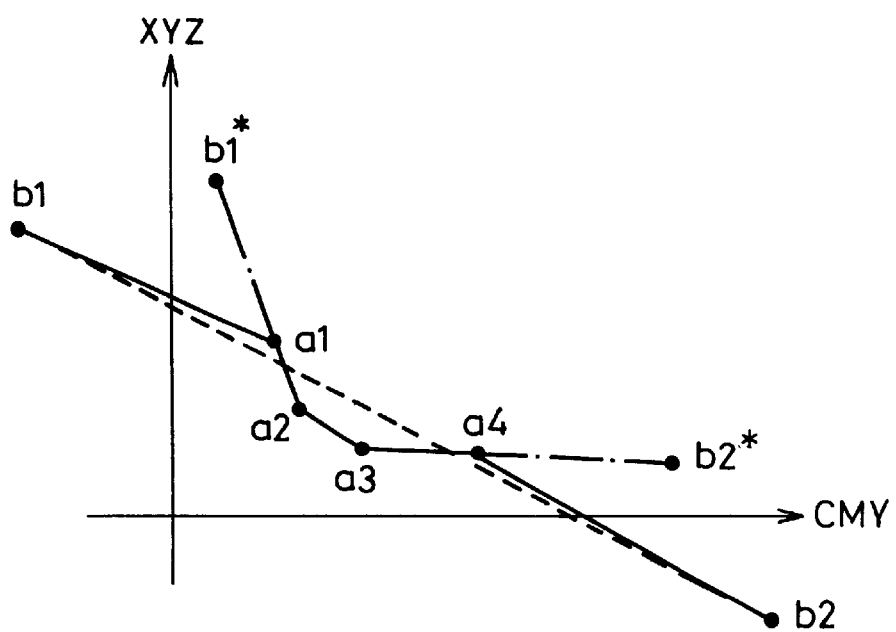
FIG. 7 is a diagram illustrative of a process of generating a hypothetical color signal according to the method of least squares.

FIG. 7 schematically shows a two-dimensional representation of the relationship between the color data CMY and the hypothetical data CMY1*, and the stimulus value data XYZ and the hypothetical stimulus value data XYZ1*. As can be understood from the above description, the relationship between the color data CMY and the stimulus value data XYZ which are obtained from the CMYK color charts with the color data K fixed decreases monotonously as indicated by points a1~a4. A four-dimensional plane calculated according to the method of least squares using the points a1~a4 is indicated by the dotted line. A plane interconnecting points b1, b2 which represent the hypothetical stimulus value data XYZ1* corresponding to the hypothetical color data CMY1* on the four-dimensional plane and the points a1~a4 decreases monotonously as indicated by the solid line. By generating the hypothetical stimulus value data XYZ1* corresponding to the hypothetical color data CMY1* according to the method of least squares as described above, it is possible to maintain a monotonous relationship between the color data CMY including the hypothetical color data CMY1* and the stimulus value data XYZ including the hypothetical stimulus value data XYZ1*.

After the hypothetical stimulus value data XYZ1* corresponding to the hypothetical color data CMY1* have been determined as described above, a new forward conversion table for converting the color data CMY including the hypothetical color data CMY1* into the stimulus value data XYZ including the hypothetical stimulus value data XYZ1* is generated in a step S14B.

Then, using the new forward conversion table, color data CMY with respect to target values (X0, Y0, Z0) for the stimulus value data XYZ including the hypothetical stimulus value data XYZ1* are determined according to the repetitive calculation process in a step S14C.

As shown in FIG. 6, a CMY color space composed of the color data CMY comprises color data CMY including hypothetical color data CMY1* arranged in a grid-like pattern. Therefore, it is possible to determine stimulus value data XYZ with respect to arbitrary color data CMY according to an interpolation process using the new forward conversion table. An XYZ color space composed of the stimulus value data XYZ obtained from the color data CMY is distorted as shown in FIG. 3B. Therefore, it is difficult to determine color data CMY with respect to arbitrary stimulus value data XYZ. Instead, color data CMY with respect to the stimulus value data XYZ are calculated according to a Newtonian process, so that color data CMY with respect to the stimulus value data XYZ arranged at regular intervals as indicated by the dotted lines in FIG. 3B are determined.

Figure 8:
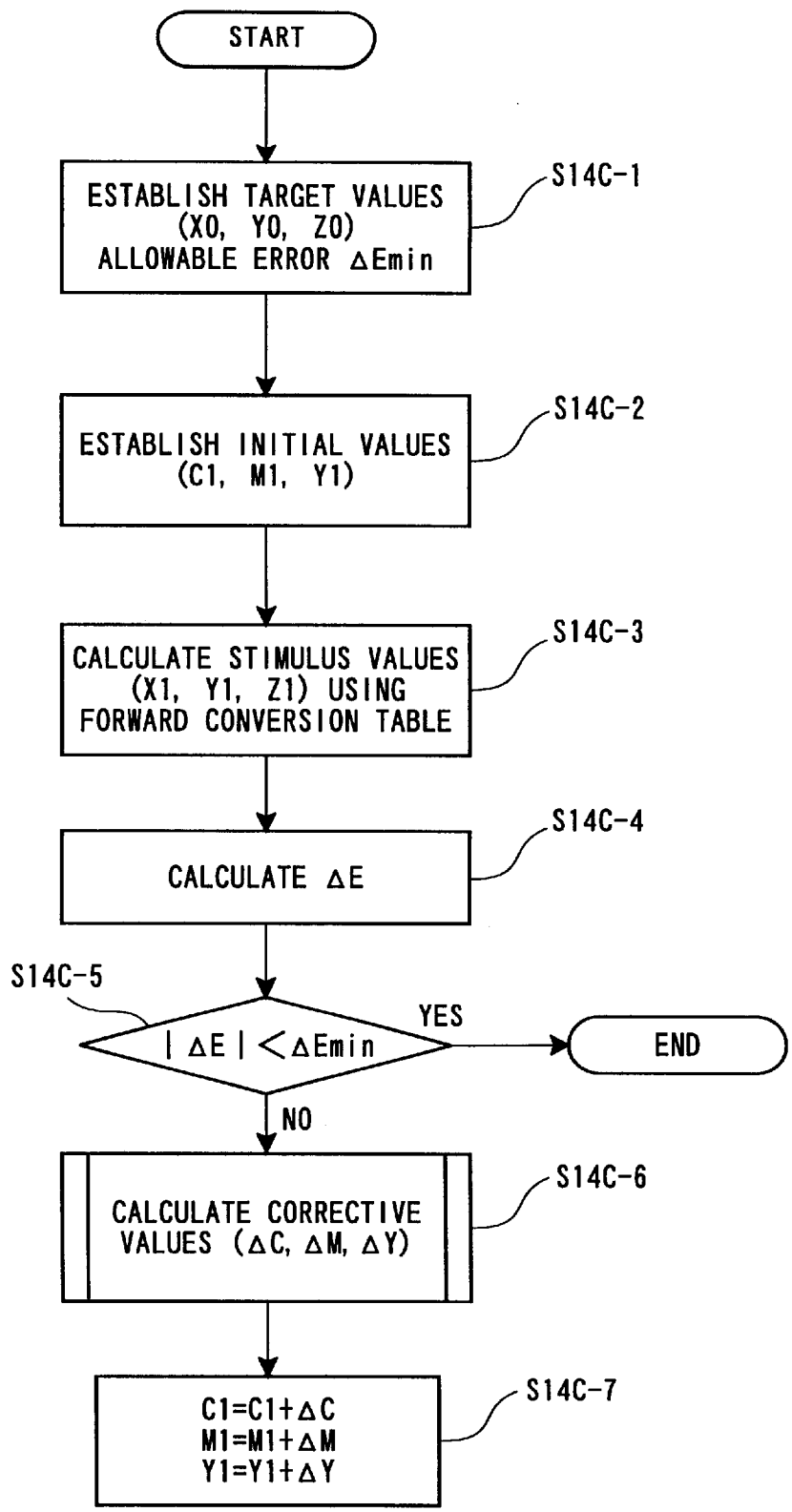
FIG. 8 is a flowchart of a process of calculating color data CMY in a step S14C of the process shown in FIG. 5.

FIG. 8 shows a process of calculating the color data CMY. Target values for the stimulus value data XYZ on the grid of the XYZ color space are set to (X0, Y0, Z0) and an allowable error in the repetitive calculation process is set to ΔEmin in a step S14C-1. Then, known initial values (C1, M1, Y1) of the color data CMY are established in a step S14C-2. Using the new forward conversion table, stimulus values (X1, Y1, Z1) with respect to the initial values (C1, M1, Y1) are determined in a step S14C-3. An error ΔE between the target values (X0, Y0, Z0) and the stimulus values (X1, Y1, Z1) is calculated in a step S14C-4. The calculated error ΔE is compared with the allowable error ΔEMin in a step S14C-5. The allowable error ΔEMin may be established as a color difference calculated according to a color difference formula in an Lab colorimetric system, for example. If |ΔE| is not smaller than ΔEmin (|ΔE|≧ΔEmin) in the step S14C-5, then corrective values (ΔC, ΔM, ΔY) are calculated in a step S14C-6, and the initial values (C1, M1, Y1) are corrected by the corrective values (ΔC, ΔM, ΔY) in a step S14C-7. Thereafter, the steps S14C-3 through S14C-5 are repeated.

Figure 9:
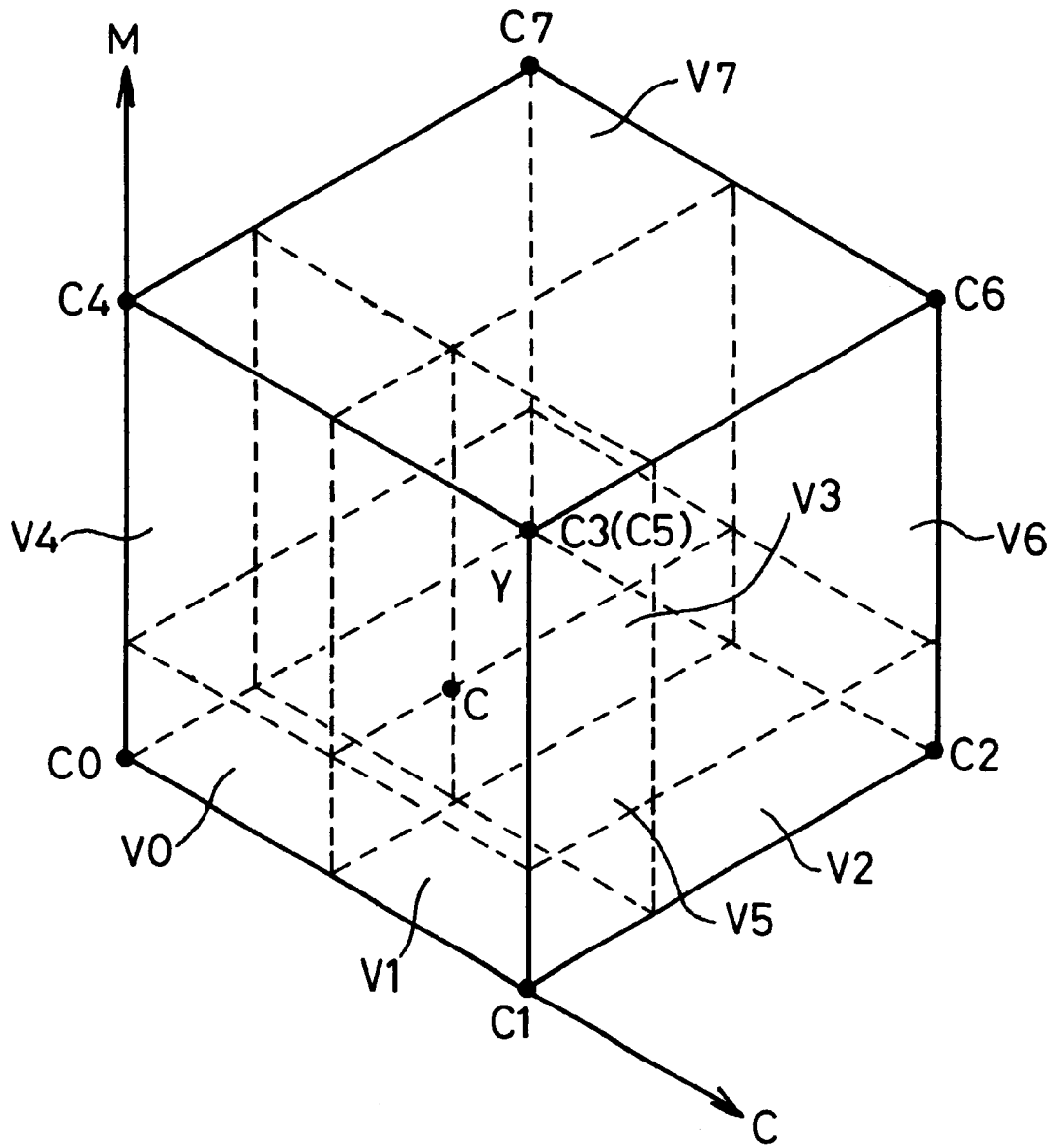
FIG. 9 is a diagram illustrative of a volumetric interpolation process.

The corrective values (ΔC, ΔM, ΔY) are determined as follows: When arbitrary color data CMY are given, stimulus data XYZ with respect to the color data CMY (indicated by points C) are determined according to the equations (4), (5), (6) given below, using, as shown in FIG. 9, stimulus value signals (x0, y0, z0)~(x7, y7, z7) corresponding to color signals (c0, m0, y0)~(c7, m7, y7) at eight grid points C0~C7, the volume V of a rectangular parallelepiped surrounded by the grid points C0~C7, and eight volumes V0~V7 divided from the volume V by an arbitrary interpolation point C in the rectangular parallelepiped.

$$X = \sum_{j=0}^{7} V_j \cdot X_j / V \quad (4)$$

$$Y = \sum_{j=0}^{7} V_j \cdot Y_j / V \quad (5)$$

$$Z = \sum_{j=0}^{7} V_j \cdot Z_j / V \quad (6)$$

If the stimulus value data XYZ with respect to the color data CMY are linear in a minute range in the relationship of the equations (4), (5), (6), then the corrective values (ΔC, ΔM, ΔY) that are minute changes of the color data CMY and minute changes (ΔX, ΔY, ΔZ) of the stimulus value data XYZ satisfy the following relationship:

$$\begin{bmatrix} \Delta X \\ \Delta Y \\ \Delta Z \end{bmatrix} = \begin{bmatrix} \frac{\partial X}{\partial Dc} & \frac{\partial X}{\partial Dm} & \frac{\partial X}{\partial Dy} \\ \frac{\partial Y}{\partial Dc} & \frac{\partial Y}{\partial Dm} & \frac{\partial Y}{\partial Dy} \\ \frac{\partial Z}{\partial Dc} & \frac{\partial Z}{\partial Dm} & \frac{\partial Z}{\partial Dy} \end{bmatrix} \begin{bmatrix} \Delta C \\ \Delta M \\ \Delta Y \end{bmatrix} \equiv J \begin{bmatrix} \Delta C \\ \Delta M \\ \Delta Y \end{bmatrix} \quad (7)$$

where J is a Jacobian matrix and Dc, Dm, Dy represent C, M, Y and are used to avoid confusion with Y of XYZ and Y of CMY. According to the equation (7), once the Jacobian matrix J is determined, it is possible to predict minute changes (ΔX, ΔY, ΔZ) of the stimulus value data XYZ with respect to the corrective values (ΔC, ΔM, ΔY) for the color data CMY. The Jacobian matrix J is determined by partially differentiating the equations (4)~(6) with the color data CMY. Therefore, the corrective values (ΔC, ΔM, ΔY) for the color data CMY are determined by:

$$\begin{bmatrix} \Delta C \\ \Delta M \\ \Delta Y \end{bmatrix} = J^{-1} \begin{bmatrix} \Delta X \\ \Delta Y \\ \Delta Z \end{bmatrix} \quad (8)$$

Figure 5:
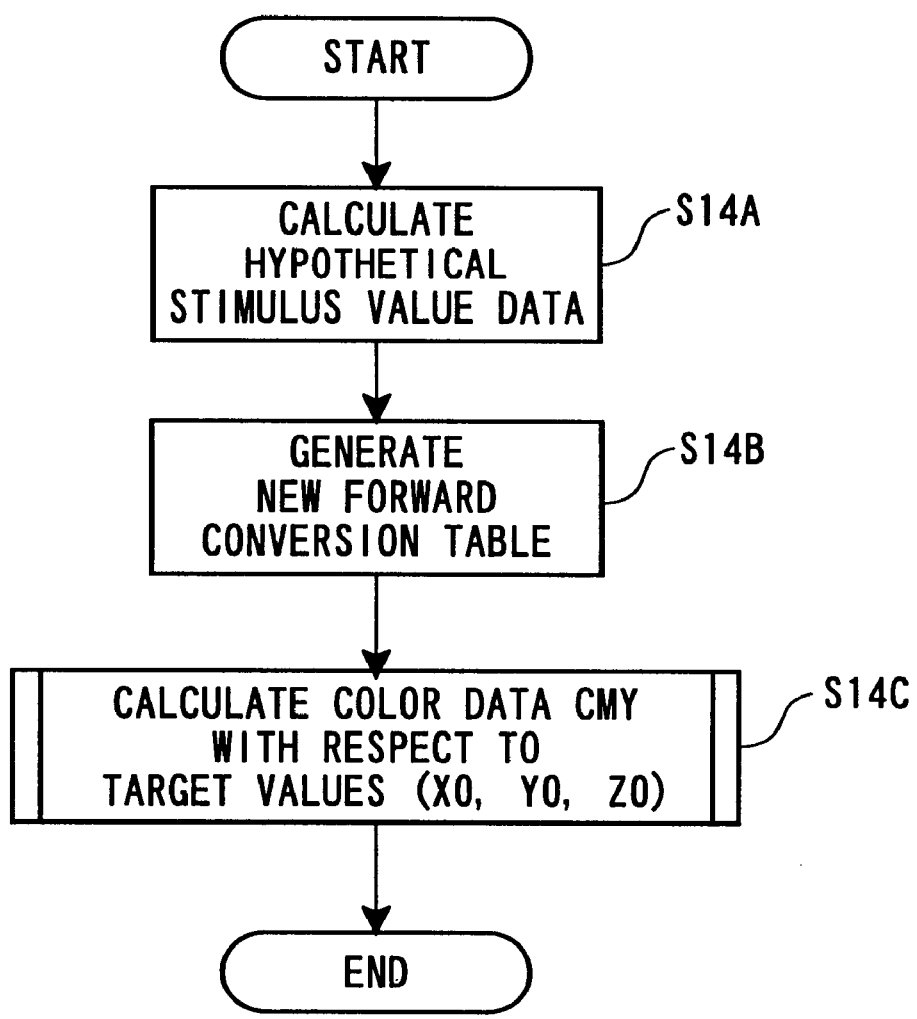
FIG. 5 is a flowchart of a color signal calculating process in a step S14 of the process shown in FIG. 4.

By effecting repetitive calculations using the Jacobian matrix J thus obtained, it is possible to determine color data CMY with respect to arbitrary target values (X0, Y0, Z0) in the step S14C (see FIG. 5).

Figure 4:
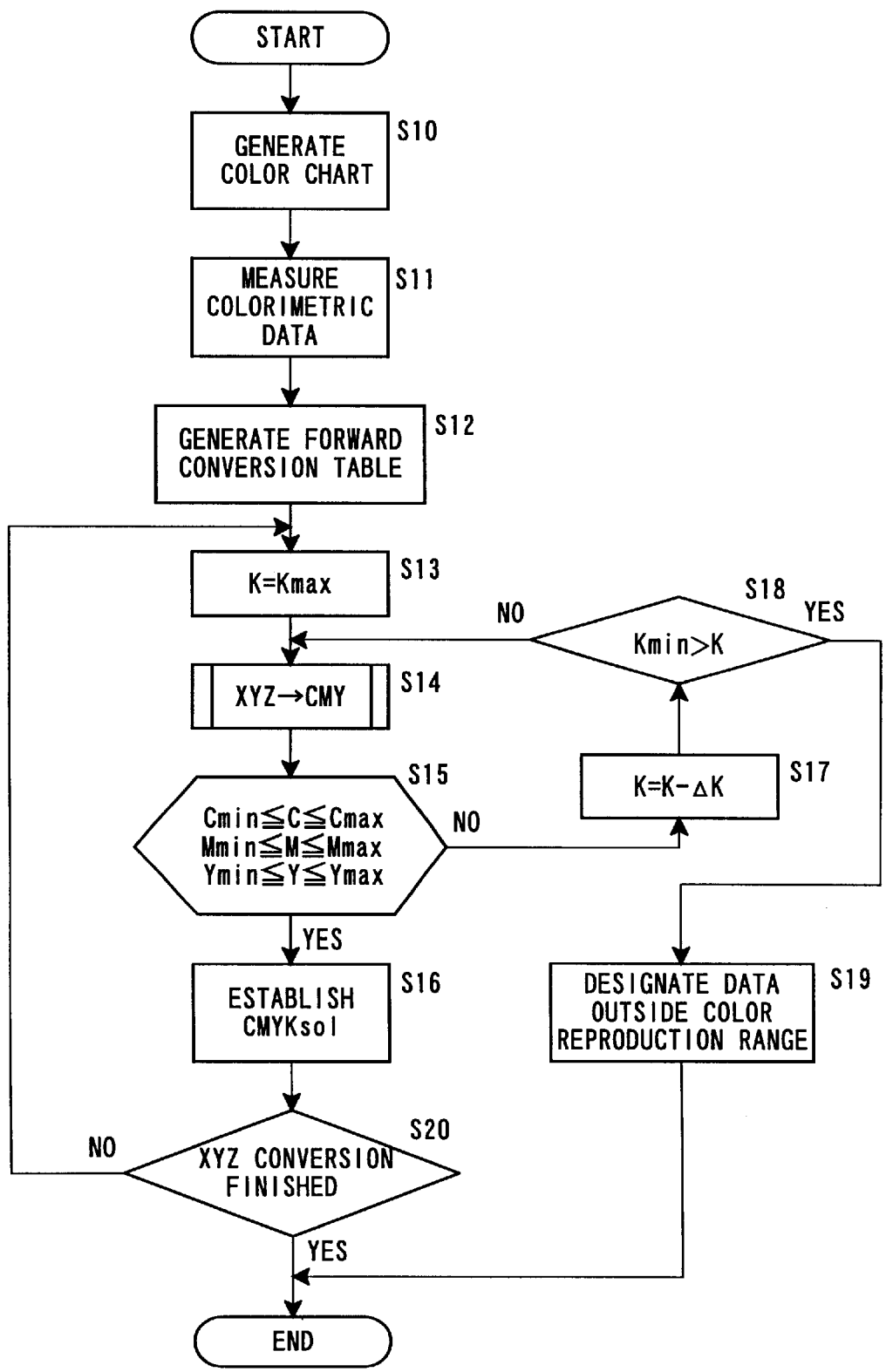
FIG. 4 is a flowchart of a process of generating a first inverse conversion table.

Thereafter, it is determined whether the color data CMY thus determined fall in a range reproducible by the image output device in a step S15 (see FIG. 4). Specifically, if the determined color data CMY satisfy the relationship:

Cmin≦C≦Cmax

Mmin≦M≦Mmax

Ymin≦Y≦Ymax (9)

where Cmin, Mmin, Ymin are minimum densities reproducible for the color data CMY and Cmax, Mmax, Ymax are maximum densities reproducible for the color data CMY, then the fixed color data K and the color data CMY are established, as color data Csol, Msol, Ysol, Ksol (which may hereinafter be referred to as "color data CMYKsol") with respect to the target values (X0, Y0, Z0) for the stimulus value data XYZ, in the first inverse conversion table generator 26 in a step S16.

If the color data CMY do not satisfy the relationship according to the above equation (9), then the color data K is set to:

K=K−ΔK (10)

in a step S17, and thereafter the step S14 is repeated insofar as the color data K is not smaller than a predetermined minimum value Kmin in a step S18. In the equation (10), ΔK represents an arbitrary data interval of the color data K of the first inverse conversion table. For example, if the color data K is established as data in a range of 0~255, then it is established at increments of 1, and if the color data K is established as data in a range of 0% ~100%, then it is established at increments of 1%.

If Kmin>K in the step S18, then since the color data CMYK with respect to the target values (X0, Y0, Z0) are outside the color reproduction range, the target values (X0, Y0, Z0) are designated as data outside the color reproduction range, with color data CMYKsol not calculated, in a step S19.

The above process is carried out with respect to all the target values (X0, Y0, Z0) for thereby determining color data CMYKsol for maximum color data K given, with respect to the stimulus value data XYZ capable of obtaining color data CMYK in the color reproduction range in a step S20.

As described above, the first inverse conversion table for obtaining the color data CMYKsol in the color reproduction range which are capable of adding the maximum color data K from the stimulus value data XYZ is generated, and established in the first inverse conversion table generator 26.

Figure 10:
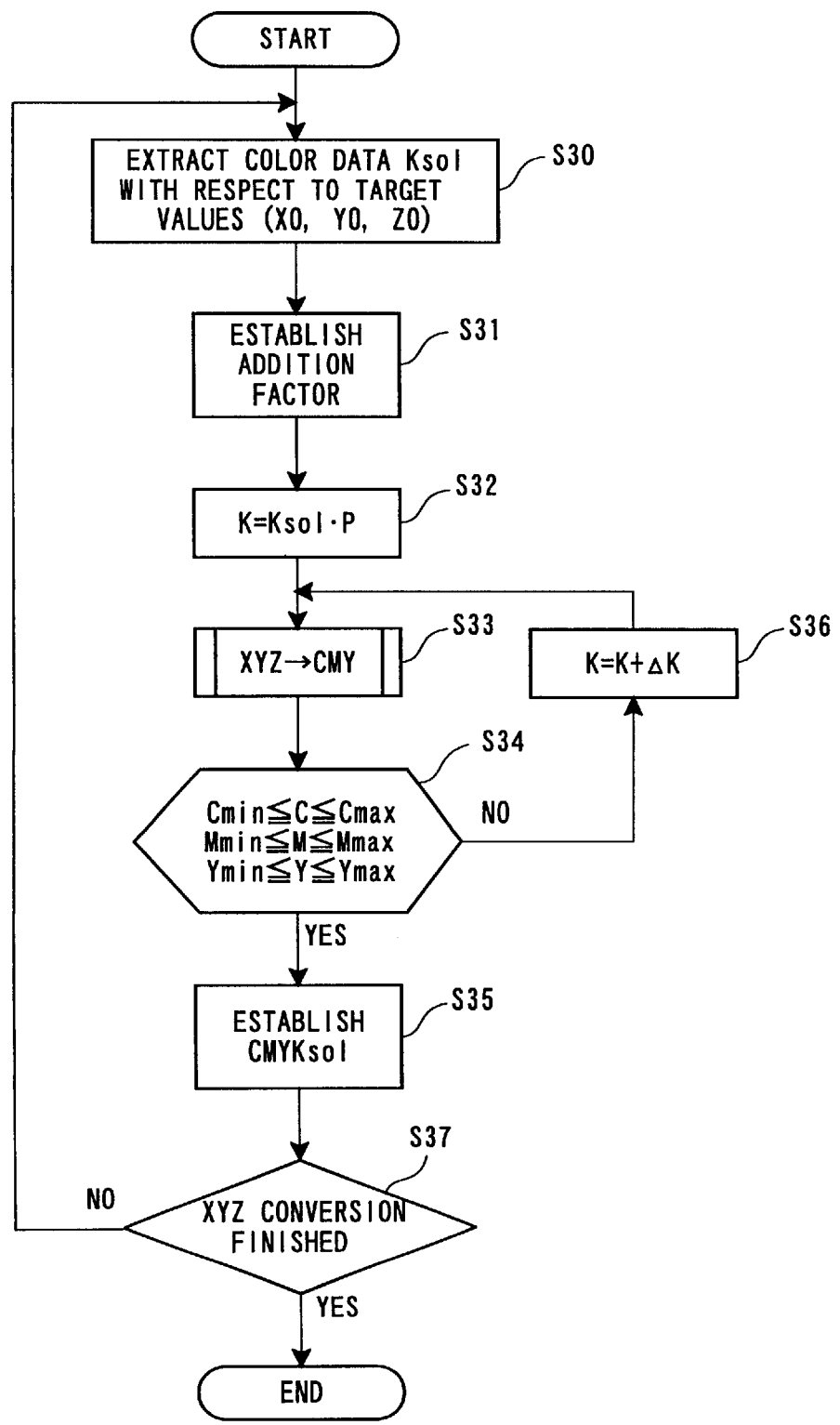
FIG. 10 is a flowchart of a process of generating a second inverse conversion table.

A process of generating a second inverse conversion table capable of adding desired color data K from the first inverse conversion table will be described below with reference to FIG. 10.

Maximum color data Ksol determined with respect to desired target values (X0, Y0, Z0) is determined from the first inverse conversion table in a step S30. A multiplication factor P ($0 \leq P \leq 1$) with respect to the target values (X0, Y0, Z0) for the color data Ksol is established in a step S31. Then, using the factor P, desired color data K is established as follows:

$$K = Ksol \cdot P \quad (11)$$

in a step S32.

Then, as with the step S14 shown in FIG. 4, the color data K is fixed to a desired value according to the equation (11), and color data CMY with respect to the target values (X0, Y0, Z0) are determined in a step S33. If the determined color data CMY fall in a predetermined range in a step S34, then the color data CMY are set to desired color data CMYKsol in a step S35. If the determined color data CMY do not fall in the predetermined range, then the color data K is set to:

$$K = K + \Delta K \quad (12)$$

in a step S36, after which the steps S33, S34 are repeated. The color data CMYK necessarily have a solution at the color data Ksol which is an upper limit thereof. According to the above process, it is possible to obtain a relationship capable of establishing color data K closest to the desired color data K established with the multiplication factor P.

The above process is carried out with respect to all the target values (X0, Y0, Z0) in the color reproduction range for thereby generating a second inversion conversion table capable of obtaining color data CMYK for desired color data K or color data K closest thereto given, with respect to desired stimulus value data XYZ in a step S37.

The second inversion conversion table thus generated does not contain a conversion relationship with respect to the stimulus value data XYZ that is designated as data outside the color reproduction range when the first inversion conversion table is generated. Therefore, the third inverse conversion table generator 30 then determines a relationship of the color data CMYK with respect to the stimulus value data XYZ as data outside the color reproduction range, thus generating a third inverse conversion table as representing the relationship of the color data CMYK with respect to all the stimulus value data XYZ.

Figure 11:
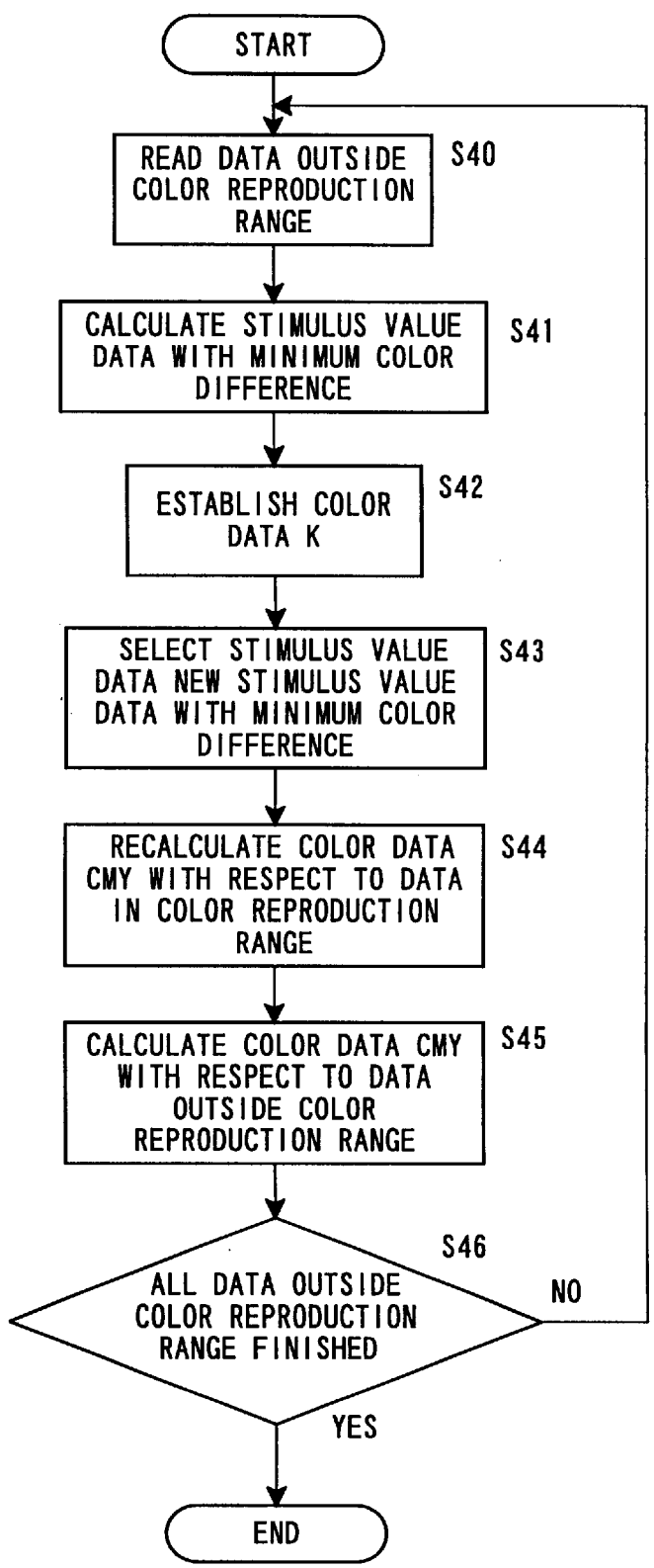
FIG. 11 is a flowchart of a process of processing color data outside a color reproduction range.

FIG. 11 shows a process of processing color data outside the color reproduction range to generate a third inverse conversion table.

As shown in FIG. 11, stimulus value data XYZ designated as data outside the color reproduction range are read in a step S40, and stimulus value data XYZ in the color reproduction range whose color difference with the above stimulus value data XYZ is minimum are determined in a step S41. Since the stimulus value data XYZ are arranged in a grid pattern, stimulus value data XYZ in the color reproduction range which are closest to the stimulus value data XYZ outside the color reproduction range may be selected thereby to generate a better third inverse conversion table than when the stimulus value data XYZ with a minimum color difference are selected. The selected stimulus value data XYZ in the color reproduction range may not necessarily be minimum in color difference with or closest in distance to the stimulus value data XYZ outside the color reproduction range, but may be close data, insofar as they fall in a visually unrecognizable range.

Then, using the second inverse conversion table, color data K with respect to the stimulus value data XYZ in the color reproduction range whose color difference (or distance) is minimum is determined, and set to color data K with respect to the stimulus value data XYZ outside the color reproduction range in a step S42. Thereafter, stimulus value data XYZ in the color reproduction range close to the stimulus value data XYZ in the color reproduction range whose color difference (or distance) is minimum are selected in a step S43. A plurality of color data CMYK with respect to these plural stimulus value data XYZ in the color reproduction range are determined using the second inverse conversion table. After the color data K is replaced with the color data established in the step S42, color data CMY with respect to the plural stimulus value data XYZ in the color reproduction range are recalculated according to the repetitive calculation process such as the Newtonian process in the step S44.

Finally, stimulus value data XYZ outside the color reproduction range are determined from the recalculated color data CMY in the color reproduction range according to a multiple regression analysis such as the method of least squares in a step S45. As shown in FIG. 7, the color data CMY outside the color reproduction range are represented by points b1\*, b2\* smoothly connected to the points a1, a2 or a3, a4 in the color reproduction range, so that color reproduced thereby will not vary extremely. The color data K in particular do not suffer variations or jumps as color data K outside the color reproduction range and adjacent color data in the color reproduction range are set to the same value.

The above process is effected on all the stimulus value data XYZ designated as data outside the color reproduction range for thereby obtaining color data CMYK with respect to the stimulus value data XYZ in a step S46.

In this manner, a third inverse conversion table for converting all the stimulus value data XYZ into color data CMYK including data outside the color reproduction range, and established in the color converter 16 in the image output device.

In the image output device, color data RBG obtained from an image signal read by the image input unit 10 are converted into stimulus value data XYZ by the common color space converter 12, and the stimulus value data XYZ are then processed as desired by the image processor 14. Then, the stimulus value data XYZ are converted into color data CMYK according to the third inverse conversion table by the color converter 16.

Figure 12A:
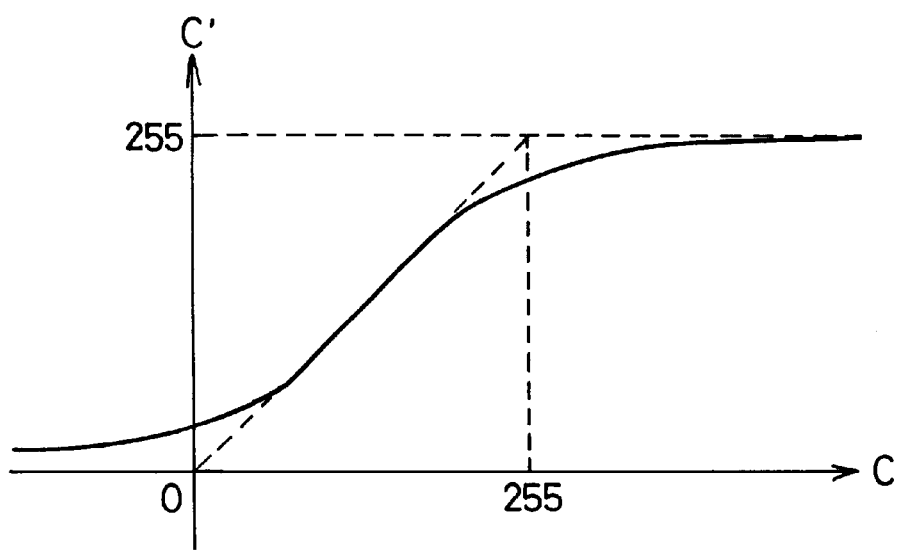
FIG. 12A is a diagram illustrative of a compression process.
Figure 12B:
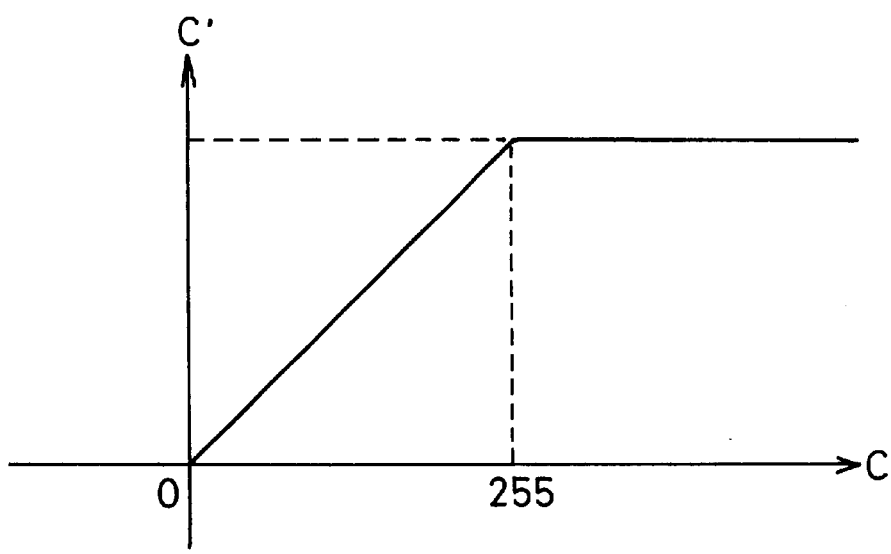
FIG. 12B is a diagram illustrative of a clipping process.

The color data CMYK thus determined contain color data CMYK outside the color reproduction range in the image output device. Therefore, the color data including those color data outside the color reproduction range are subject to a gamut mapping process. The gamut mapping process may be a process of compressing the color data CMYK including those outside the color reproduction range, as indicated by the solid-line curve in FIG. 12A. Alternatively, the gamut mapping process may be a process of clipping the color data CMYK outside the color reproduction range with maximum and minimum levels, while keeping the color data CMYK in the color reproduction range as they are, as indicated by the solid-line curve in FIG. 12B. The gamut mapping process thus effected can convert the color data CMYK outside the color reproduction range into the color data CMYK in the color reproduction range. Inasmuch as the color data CMYK prior to being subject to the gamut mapping process have been smoothly connected to the color data CMYK outside the color reproduction range, the color data K in particular produced after the color data CMYK are processed by the gamut mapping process do not suffer undue variations. Because the color data CMYK which are data in the inherent color space of the image output device are processed by the gamut mapping process, the color data can be converted taking into account the output characteristics of the image output device.

The color data CMYK thus generated are outputted as a visible image from the image output unit 18.

In the illustrated embodiment, the second inverse conversion table for determining color data CMYK from the stimulus value data XYZ is determined according to the repetitive calculation process based on the Newtonian process as a conversion relationship between three-variable color data and three-variable color data with color data K being fixed. However, the second inverse conversion table may be determined according to any of various other processes. For example, a relationship of color data K with respect to color data CMY may be established as a known relationship in advance. Alternatively, the colorimetric data of a relationship of stimulus value data XYZ with respect to color data CMYK may be measured, each of three-dimensional spaces of the color data CMY and the stimulus value data XYZ may be divided into small triangular pyramids, and data contained in corresponding triangular pyramids may be linearly calculated to determine color data CMY with respect to stimulus value data XYZ. If no color data are determined, then the color data K may be changed, and color data CMYK at the time color data are determined may be established as color data CMYK with respect to stimulus value data XYZ.

In the illustrated embodiment, four-variable color data CMYK are determined from three-variable stimulus value data XYZ. However, the present invention is also applicable to a process of converting data of a first colorimetric system of three variables into data of a second colorimetric system of three variables.

In the illustrated embodiment, after stimulus value data XYZ are converted into color data CMYK inherent in the image output device based on the second inverse conversion table, the color data CMYK are subject to the gamut mapping process. However, for faster processing, the second inverse conversion table may be processed by the gamut mapping process in advance to generate a third inverse conversion table capable of obtaining color data CMYK in the color reproduction range, and signals may be converted altogether by the color converter 16 using the third inverse conversion table.

In the illustrated embodiment, the second inverse conversion table is determined as a relationship of color data CMYK with respect to stimulus value data XYZ. However, the second inverse conversion table may be determined as a relationship of color data CMYK with respect to colorimetric data L*, a*, b* or L*, u*, v*, and a third inverse conversion table may be determined on the basis of the By second inverse conversion table, after which the color data may be processed by the gamut mapping process thereby to produce color data CMYK which are less liable to suffer visual jumps. The color data CMYK thus produced are less liable to suffer visual jumps because visually close color data CMYK in the color reproduction range are used to estimate color data CMYK outside the color reproduction range.

Although a certain preferred embodiment of the present invention has been shown and described in detail, it should be understood that various changes and modifications may be made therein without departing from the scope of the appended claims.

What is claimed is:

1. A method of converting color data, comprising:

(a) a step for determining a color conversion relationship for converting data of a first colorimetric system into data of a second colorimetric system;

(b) determining whether any of said data of the second colorimetric system produced by said color conversion relationship falls outside a color reproduction range of said second colorimetric system as out of boundary data, and if any data of the second colorimetric system falls outside said color reproduction range, determining proximal data of said first colorimetric system, corresponding to data of said second colorimetric system which are vectorially close to the out of boundary data and fall in the color reproduction range;

(c) determining an approximation of data of the second colorimetric system outside the color reproduction range from the data of said second colorimetric system with respect to the proximal data in said first colorimetric system determined in said step (b), thereby determining a second color conversion relationship for converting data of the first colorimetric system which fall outside the color reproduction range of the second colorimetric system into data of the second colorimetric system outside the color reproduction range;

(d) effecting gamut mapping to bring the data of said second colorimetric system into the color reproduction range, using the color conversion relationship determined in said step (a) and the second color conversion relationship of step (c),wherein data in the color reproduction range is operable to output a color image data that corresponds to input image data from the first colorimetric system; and (e) outputting a color image by at least one of: controlling a printing process using data in the color reproduction range and controlling a color monitor output using data in the color reproduction range, wherein data of the second colorimetric system are estimated according to a multiple regression process in said step (c).

2. A method according to claim 1, wherein the data of said first colorimetric system determined in said step (a) have a minimum color difference with the data of said first colorimetric system which correspond to the data of said second colorimetric system that fall in the color reproduction range.

3. The method according to claim 1, wherein least squares calculations are used as the multiple regression process.

4. A method according to claim 1, wherein the data of said second colorimetric system are compressed by gamut mapping in said step (d).

5. A method according to claim 1, wherein the data of said second colorimetric system are clipped by gamut mapping in said step (d).

6. A method of converting color data, comprising:

(a) a step for determining a color conversion relationship for converting data of three variables of a first colorimetric system into data of four variables of a second colorimetric system;

(b) determining whether any of said data of the second colorimetric system produced by said color conversion relationship falls outside a color reproduction range of said second colorimetric system as out of boundary data, and if any data of the second colorimetric system falls outside said color reproduction range, determining proximal data in said first colorimetric system corresponding to data of said second colorimetric system which are vectorially close to the out of boundary data and fall in the color reproduction range;

(c) selecting data of one of said four variables of said second colorimetric system with respect to the data of said first colorimetric system determined in said step (b), and using the selected data of said one of the four variables as data of said one of the four variables of said second colorimetric system outside the color reproduction range, thereby determining a second color conversion relationship;

(d) determining an approximation of data of three variables of the second colorimetric system outside of the color reproduction range, other than the data of said one of the four variables of said second colorimetric system outside the color reproduction range, from the data of the three variables of said second colorimetric system in the color reproduction range, thereby determining a third color conversion relationship for converting data of the first colorimetric system outside the color reproduction range into data of the second colorimetric system outside the color reproduction range;

(e) effecting gamut mapping to bring the data of said second colorimetric system into the color reproduction range, using the color conversion relationship determined in said step (a), the second color conversion relationship in said step (c), and the third color conversion relationship in said step (d), wherein data in the color reproduction range is operable to output a color image data that corresponds to input image data from the first colorimetric system; and (f) outputting a color image by at least one of: controlling a printing process using data in the color reproduction range and controlling a color monitor output using data in the color reproduction range, wherein said data of the second colorimetric system are estimated according to a multiple regression process in said step (d).

7. A method according to claim 6, wherein said step (a) comprises the steps of determining data of three variables of said first colorimetric system with respect to known data of four variables of said second colorimetric system as a forward conversion relationship and thereafter determining data of four variables of said second colorimetric system in the color reproduction range with respect to data of three variables of said first colorimetric system as an inverse conversion relationship, using said forward conversion relationship.

8. A method according to claim 6, wherein said step (d) comprises the steps of setting to the same value all the data of said one of the four variables of said second colorimetric system corresponding to the data close to the data of said first colorimetric system determined in said step (b), determining again data of the other variables of said second colorimetric system as said color conversion relationship in said step (a), and estimating data of the three variables outside the color reproduction range from the determined data of the second colorimetric system.

9. A method according to claim 6, wherein the data of said second colorimetric system comprise data C, M, Y, K, and the data of said one of the four variables comprise data K.

10. The method according to claim 1, wherein data of the second colorimetric system with respect to data of the first colorimetric system is determined by a method of repetitive calculation.

11. A method according to claim 6, wherein the data of said second colorimetric system are compressed by gamut mapping in said step (e).

12. A method according to claim 6, wherein the data of said second colorimetric system are clipped by gamut mapping in said step (e).

13. A method according to claim 6, wherein the data of said first colorimetric system comprise data of an L*a*b* colorimetric system.

14. A method according to claim 6, wherein the data of said first colorimetric system comprise data of an L*u*v* colorimetric system.

15. A method according to claim 6, wherein the data of said first colorimetric system comprise data of an XYZ colorimetric system.

16. A method of converting color data comprising:

a) determining a forward color conversion relationship between a first colorimetric system and a second multivariable colorimetric system, wherein said second multivariable colorimetric system is represented by data spaced at regular grid points based upon measurements, and said first colorimetric system is primarily represented by data spaced at irregular intervals from said grid points, wherein said forward color conversion relationship is determined by interpolation of data between said first colorimetric system and second multivariable colorimetric system;

b) fixing a variable in said second multivariable colorimetric system and determining an inverse relationship between said first colorimetric system and said second multivariable colorimetric system;

c) setting a data point outside of said color reproduction range of said second multivariable colorimetric system as out of boundary data and determining an approximation point in said first colorimetric system to correspond to the out of boundary data, said approximation point being vectorially close to the out of boundary data;

d) determining an approximation of data of the second multivariable colorimetric system outside the color reproduction range from said data of said second multivariable colorimetric system with respect to the approximation point in said first colorimetric system determined in said step (c) thereby determining a second color conversion relationship for converting data of the first colorimetric system which fall outside the color reproduction range into data of the second multivariable colorimetric system outside the color reproduction range;

e) gamut mapping data of said second multivariable colorimetric system into the color reproduction range, using the forward color conversion relationship determined in said step (a) and said second color conversion relationship determined in said step (d), wherein data in the color reproduction range is operable to output a color image data that corresponds to input image data from the first colorimetric system; and (f) outputting a color image by at least one of: controlling a printing process using data in the color reproduction range and controlling a color monitor output using data in the color reproduction range, wherein data of the second multivariable colorimetric system are estimated according to a multiple regression analysis in said step (d).

17. The method of converting color data of claim 16, wherein said approximation point is determined to fall on a plane having a minimum distance to a data point within the reproduction range, and said plane includes said out of boundary data of the second multivariable colorimetric system.

18. The method of converting color data of claim 17, wherein said approximation point, said out of boundary data and said data point within the reproduction range monotonically decrease in said plane.

19. The method of converting color data of claim 16, wherein prior to said gamut mapping step, the method includes a further step of varying the variable fixed in said step b) according to a multiplying factor to determine a minimum error between a color output of said second multivariable colorimetric system and a desired output.

20. The method of converting color data of claim 18, wherein said first colorimetric system is selected from a group consisting of XYZ, l*a*b* and l*u*v* color systems and said second multivariable colorimetric system comprises CMYK and in said step b), the variable that is fixed is K.

21. The method of claim 16, wherein said approximation point in said first colorimetric system in said step c) is determined according to a multiple regression analysis using a method of least squares with respect to data points falling within a reproduction range of the second multivariable colorimetric system.

22. The method of claim 21, wherein said approximation point in said first colorimetric system and said data points falling within the reproduction range of the second multivariable colorimetric system have a monotonically decreasing relationship.

* * * * *